(12) United States Patent
Jurison

(10) Patent No.: US 12,120,592 B2
(45) Date of Patent: Oct. 15, 2024

(54) CONTROLLING INSERTON OF CONTENT INTO BROADCAST PAYLOAD

(71) Applicant: iHeart Media Management Services, Inc., San Antonio, TX (US)

(72) Inventor: Alan W. Jurison, Syracuse, NY (US)

(73) Assignee: iHeart Media Management Services, Inc., San Antonio, TX (US)

( * ) Notice: Subject to any disclaimer, the term of this patent is extended or adjusted under 35 U.S.C. 154(b) by 0 days.

(21) Appl. No.: 18/538,525

(22) Filed: Dec. 13, 2023

(65) Prior Publication Data

US 2024/0114329 A1    Apr. 4, 2024

Related U.S. Application Data

(63) Continuation of application No. 17/743,921, filed on May 13, 2022, now Pat. No. 11,877,223, which is a continuation of application No. 17/091,444, filed on Nov. 6, 2020, now Pat. No. 11,337,049, which is a continuation of application No. 16/742,979, filed on Jan. 15, 2020, now Pat. No. 10,841,779.

(60) Provisional application No. 62/793,155, filed on Jan. 16, 2019.

(51) Int. Cl.
| | |
|---|---|
| *H04M 11/04* | (2006.01) |
| *H04H 20/59* | (2008.01) |
| *H04L 43/10* | (2022.01) |
| *H04N 21/488* | (2011.01) |
| *H04N 21/81* | (2011.01) |
| *H04W 4/06* | (2009.01) |
| *H04W 4/90* | (2018.01) |
| *H04W 68/00* | (2009.01) |
| *H04W 76/50* | (2018.01) |

(52) U.S. Cl.
CPC .............. *H04W 4/90* (2018.02); *H04H 20/59* (2013.01); *H04L 43/10* (2013.01); *H04N 21/4882* (2013.01); *H04N 21/814* (2013.01); *H04W 4/06* (2013.01); *H04W 68/005* (2013.01); *H04W 76/50* (2018.02)

(58) Field of Classification Search
None
See application file for complete search history.

(56) References Cited

U.S. PATENT DOCUMENTS

| | | | |
|---|---|---|---|
| 10,841,779 B2 | 11/2020 | Jurison | |
| 2006/0271815 A1 | 11/2006 | Mizuno et al. | |
| 2009/0023418 A1 | 1/2009 | Grevers, Jr. | |

*Primary Examiner* — Gary Lafontant
(74) *Attorney, Agent, or Firm* — Harness, Dickey & Pierce, P.L.C.

(57) ABSTRACT

An importer-exporter includes a processor, a network interface coupled to the processor and configured to communicate with an external device via a communications network, and memory coupled to the processor. The memory stores a program of instructions, wherein executing the program of instructions configures the processor to receive, from an external device via the network interface, a request to insert media content into a broadcast payload, and to determine whether the external device is authorized to provide the media content for insertion into the broadcast payload. In response to determining that the external device is authorized, the program of instructions configures the processor to login the external device to the importer-exporter, receive the media content from the external device, and insert the media content into the broadcast payload.

20 Claims, 5 Drawing Sheets

CONTROLLING INSERTON OF CONTENT INTO BROADCAST PAYLOAD

CROSS REFERENCE TO RELATED PATENTS

The present U.S. Utility Patent Application claims priority pursuant to 35 U.S.C. § 120 as a continuation of U.S. Utility application Ser. No. 17/743,921, entitled "SWITCHING EMERGENCY ACTION MESSAGES INTO SELECT MEDIA BROADCASTS," filed May 13, 2022, which is a continuation of U.S. Utility application Ser. No. 17/091,444, entitled "REPLACEMENT OF CHANNEL CONTENT WITH NOTIFICATION CONTENT," filed Nov. 6, 2020, now U.S. Pat. No. 11,337,049, which is a continuation of U.S. Utility application Ser. No. 16/742,979, entitled "INSERTION OF NOTIFICATIONS INTO IN-BAND ON-CHANNEL BROADCASTS," filed Jan. 15, 2020, now U.S. Pat. No. 10,841,779 on Nov. 17, 2020, which claims priority pursuant to 35 U.S.C. § 119(e) to U.S. Provisional Application No. 62/793,155 entitled "RADIO SYSTEM ARCHITECTURE,", filed Jan. 16, 2019, which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates, generally, to inserting content into a broadcast payload, and more specifically to controlling the insertion of content into a broadcast payload.

2. Description of Related Art

In the United States each analog FM radio station is assigned a channel centered on a particular frequency, with spacing of 0.2 MHz between channels. If an analog radio station is, for example, assigned a frequency of 93.7 MHz, the next station cannot be closer than 93.5 MHz or 93.9 MHz An analog FM station, however, does not actually need to use the entire 0.2 MHz bandwidth for broadcasting the FM signal. Even leaving room for a guard band to help protect against interference from adjacent stations, there is enough remaining bandwidth to accommodate the transmission of digital signals within the 0.2 MHz of bandwidth allocated to the FM radio station.

Broadcasting both digital and analog radio signals in the same portion of the radio frequency spectrum previously used to broadcast only the analog radio station, 0.2 MHz in this example, is referred to generically as in-band on-channel (IBOC) broadcasting. Many members of the public know in-band on-channel broadcasting by the name HD Radio, which is a brand name used by iBiquity®.

In the United States, the Emergency Alert System (EAS) is commonly used to deliver important emergency information over television and radio. The EAS system used by radio broadcasters is currently implemented using low-level control signaling, in which an EAS decoder-encoder is used for each radio channel. When the EAS decoder-encoder receives emergency alert audio to be broadcast, the EAS decoder-encoder sends a control signal to specially constructed hardware that switches out the normal audio source and substitutes the emergency alert audio provided by the EAS decoder-encoder.

Consider, for example, the prior art notification insertion system 100 illustrated in FIG. 1. Emergency Alert System (EAS) Audio 101 is transmitted to both Channel A EAS Encoder-Decoder 110 and Channel B EAS Encoder-Decoder 120, which are each associated with their respective broadcast channels. In this example Channel A is a supplemental program service (SPS) or multicast channel such as HD-2, and Channel B is a different SPS or multicast channel such as HD-3. In the present system, there may be up to 7 SPS or multicast channels per station, i.e., HD-4 (Channel C), HD-5 (Channel D), HD-6 (Channel E), HD-7 (Channel F), HD-8 (Channel G). However, this is scalable beyond this as new enhanced modes are developed (i.e., HD-n).

Channel A EAS Encoder-Decoder 110 transmits EAS Notification 102 to Channel A AES/EBU (Audio Engineering Society/European Broadcasting Union) switcher 115, along with control signal 104, and Channel B EAS Encoder-Decoder 120 transmits EAS Notification 102 to Channel B AES/EBU switcher 125, along with control signal 108. Control signals 104 and 108 are "direct" or low-level voltage control signals, not packetized messages, thereby allowing control signals 104 and 108 to directly control the respective AES/EBU switchers 115 or 125.

In addition to receiving a control signal and a notification from their own dedicated EAS encoder-decoders, Channel A AES/EBU switcher 115 receives Channel A HD Audio 103 and Channel B AES/EBU switcher 125 receives Channel B HD Audio 105. When there is no emergency notification incoming from the EAS encoder-decoders, the two AES/EBU switchers 115 and 125 transmit the HD audio for their respective channels for broadcast, but when an emergency notification needs to broadcast, control signals 104 and 108 cause the two AES/EBU switchers 115 and 125 to change audio sources, so that instead of transmitting the channel's normal HD audio for broadcast, the emergency notifications are transmitted in their place. For example, Channel A selected audio 133 is either the normal Channel A HD audio 103, or EAS notification 102, and Channel B selected audio 135 is either the normal Channel B HD audio 105, or EAS notification 102, depending on the state of control signals 104 and 108.

Channel A selected audio 133 is transmitted to Channel A audio processor 140, and Channel B selected audio 135 is transmitted to Channel B audio processor 150, which digitize the audio if necessary, and adjust signal levels to provide consistent audio levels, peak leveling and frequency enhancement. Channel A processed audio 144 is transmitted from Channel A audio processor 140, and Channel B processed audio 154 is transmitted from Channel B audio processor 150 to HD importer/exporter 160. HD importer/exporter 160 converts the processed audio to an HD format using an appropriate codec, such as the HD codec by Xperi®, and combines the processed audio 144 and 154 into broadcast payload 161. Broadcast payload 161 is transmitted to transmitter 170 for broadcast.

As illustrated by the above discussion, current systems require EAS encoder-decoders to be hardwired to an AES/EBU switcher on a per-channel basis, which can be inefficient because it requires significant hardware duplication to insert notification into IBOC broadcasts.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Unless otherwise specified or required by context, the term "in-band on-channel (IBOC)," as used herein, refers generally to broadcasting one or more digital RF signals in the same RF channel in which an analog signal is being concurrently broadcast, using one or more sidebands of the analog signal within the RF channel. The term "IBOC" is used interchangeably with the term "HD," and should be construed as a generic reference to what is colloquially referred to as HD. Although some embodiments may be implemented using mixed analog and digital IBOC techniques, at least one embodiment uses all-digital IBOC techniques without analog techniques.

The term "channel" as used herein, is context dependent. In most cases, "channel" refers to a particular frequency, or set of frequencies, of a physical medium used by a particular media station to broadcast or otherwise transmit content. So, for example, an analog station's primary broadcast frequency is referred to as a channel. However, sub-bands of the analog station's primary frequency used in IBOC transmissions, are also referred to as "channels." Thus, the primary range of audio frequency used by an analog radio station is a channel, and HD channels used to transmit content by that same radio station in sub-bands of the primary range of audio frequencies are also referred to as "channels."

Figure 2:
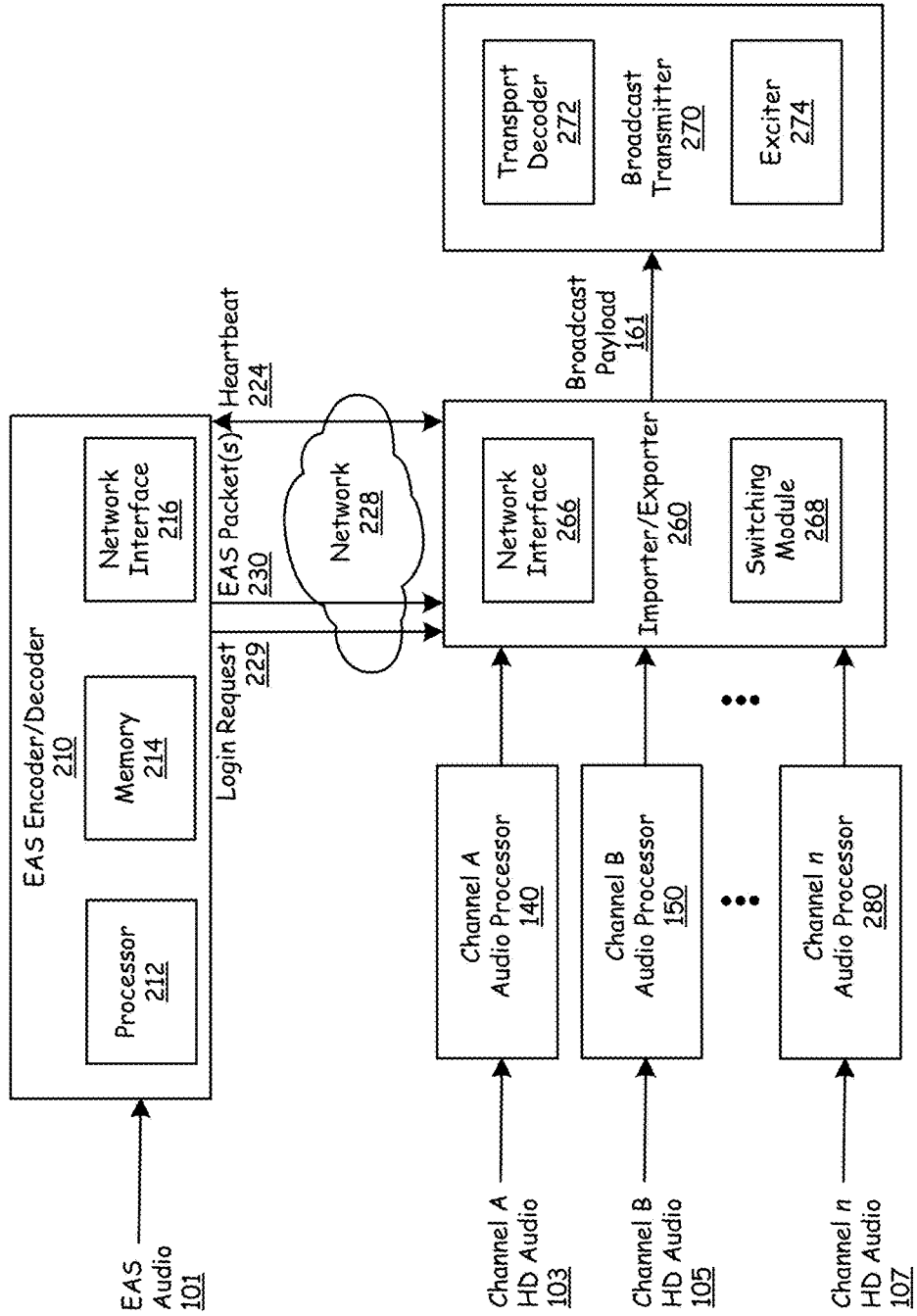
FIG. 2 is a block diagram illustrating an IBOC broadcasting system including a single Emergency Alert System Encoder-Decoder to insert notifications into multiple broadcast channels, according to various embodiments of the present disclosure.

Referring now to FIG. 2, IBOC broadcasting system 200, which uses a single Emergency Alert System Encoder-Decoder 210 for inserting into multiple broadcast channels, will be discussed according to various embodiments of the present disclosure. IBOC broadcasting system 200 includes EAS Encoder-Decoder 210, which includes processor 212, memory 214, and network interface 216, which can be coupled to Importer-Exporter 260 via a communications network 228; audio processors for n audio channels, including Channel A audio processor 140, Channel B audio processor 150, and Channel n audio processor 280; importer-exporter 260; and Transmitter 270, which can include transport decoder 272 and exciter 274. Although not specifically illustrated, audio processors 140, 150, and 280 also include processors, memories, and in various embodiments network interfaces, and may communicate with Importer-Exporter 260 via a communications network similar to network 228.

In at least one embodiment, the functions of Channel A audio processor 140, Channel B audio processor 150, and Channel n audio processor 280 are similar to audio processors known in the art. Any or all of the audio processors 140, 150, and 280 can be configured to modify incoming channel content, for example HD audio content 103, 105, or 107 by performing volume level control, analog to digital conversion, storage, data compression, music information retrieval, speech processing, localization, acoustic detection, noise cancellation, acoustic fingerprinting, sound recognition, synthesis, equalization, filtering, level compression, echo and reverb removal or addition, frequency enhancement, and various other types of signal modifications. The term "channel content" includes media content intended for broadcast or use by a particular channel. Examples herein are primarily discussed in the context of audio content associated with radio stations employing IBOC broadcast techniques, but these examples can also be applied to analog radio stations, television stations, or the like.

In some embodiments, Channel A audio processor 140, Channel B audio processor 150, and Channel n audio processor 280 are dedicated, special purpose devices. In other embodiments, Channel A audio processor 140, Channel B audio processor 150, and Channel n audio processor 280 can be implemented using modules embedded in another device included in a transmission chain, or as a cloud-based service. For example, one or more of Channel A audio processor 140, Channel B audio processor 150, and Channel n audio processor 280 can be implemented in a peripheral device connected via a Universal Serial Bus (USB), in a peripheral component interconnect (PCI) or peripheral component interconnect express (PCIe) card inserted or attached in a computer, as a module included Importer-Exporter 260, or the like.

The processed outputs from Channel A audio processor 140, Channel B audio processor 150, and Channel n audio processor 280 are transmitted to importer exporter 260, which encodes the processed outputs and combines them to generate Broadcast Payload 161, which is transmitted to Transmitter 270. In general, an importer function manages HD subchannels, emergency alerts, and data services, while an exporter function handles the timing and synchronization of the HD subchannels to analog audio. In at least one embodiment, generating Broadcast Payload 161 includes encoding the Broadcast payload for transport over a communications network (not explicitly illustrated). In implementations where Transmitter 270 and Importer-Exporter 260 are co-located, the two devices can communicate using, for example, a Local Area Network (LAN). In implementations where Transmitter 270 and Importer-Exporter 260 are not co-located, Transmitter 270 and Importer-Exporter 260 can communicate via a Wide Area Network (WAN), such as the Internet, or the like.

EAS Encoder-Decoder 210 receives EAS Audio 101, for example in the form an emergency alert signal, digitizes EAS Audio 101 if not already received in digital format, and generates EAS Packet(s) 230 to include the Audio information received in EAS Audio 101. EAS Encoder-Decoder 210 transmits EAS Packet(s) 230 to Importer-Exporter 260 via Network Interface 216. EAS Packet(s) 230 include the notification content that is later incorporated into Broadcast Payload 161 by Importer-Exporter 260. EAS Audio 101 includes, in at least one embodiment, a notification message, such as a government issued emergency alert notification, to be broadcast in place of non-emergency content being currently broadcast on HD Channel A, HD Channel B, or HD Channel n.

Importer-Exporter 260 receives EAS Packet(s) 230 via Network Interface 266, can decrypt, decode, or otherwise extract and/or reconstruct the content of the notification message included in EAS Audio 101 from EAS Packet(s) 230. In at least one embodiment, Importer-Exporter 260 acts on EAS Packet(s) 230 only if EAS Encoder-Decoder 210 has been granted access by Importer-Exporter 260 to one or more supplemental program service (SPS) channels served by Importer-Exporter 260.

Access to one or more SPS channels can be granted if, for example, Importer-Exporter 260 can authenticate EAS Encoder-Decoder 210, and if, upon authentication, Importer-Exporter 260 can verify that EAS Encoder-Decoder 210 is authorized to access the SPS channels for which access has been requested. Various public-private key communications protocols and procedures can be used to authenticate EAS Encoder-Decoder 210, and validate its authorization for access, including the use of third-party trust or certificate authorities, Active Directory, locally stored and managed lists, or the like.

For example, upon receipt of EAS Audio 101, or some other indication that a notification is being, or will be received, EAS Encoder-Decoder 210 can generate login request 229, and transmit login request 229 to Importer-Exporter 260. In various embodiments, switching module 268 processes the login request, while in other embodiments, login requests are handled by a module other than switching module 268 (not explicitly illustrated). Importer-Exporter 260 conditions login success based on EAS Encoder-Decoder 210 satisfying predetermined login requirements. If the login request is granted by Importer-Exporter 260, Importer-Exporter 260 can deliver the contents of EAS Packet(s) 230 to transmitter 270 in the Broadcast Payload 161 in place of the HD audio normally included in Broadcast Payload 161.

This substitution or replacement of content, or switching of content sources from the respective audio processors 140, 150, and/or 280 to EAS Encoder-Decoder 210, can be for some or all channels served by Importer-Exporter 260, and in at least one embodiment will continue for as long as EAS Encoder-Decoder 210 is logged in. The switching, or substitution of content received from audio processors 140, 150, and/or 280 for content received from EAS Encoder-Decoder 210 is sometimes referred to as an "override," "insertion" or "preemption".

In various embodiments, EAS Encoder-Decoder 210 remains logged in for a set period of time calculated from the time Encoder-Decoder 210 is granted access, and is then automatically logged out. In other embodiments, the time is calculated from a timestamp included in login request 229, or based on some other predetermined point in time, time marker, etc. In at least one embodiment, EAS Encoder-Decoder 210 remains logged in for a set amount of time measured from the time a first packet of EAS Packet(s) 230 is received. In various implementations employing fixed login periods, the fixed period can vary based on the type or duration of notification or alert, or on a set-login-period parameter which may or may not be provided in the login request 229, in an initial EAS Packet(s) 230, or in some other stream-setup process. In some embodiments, a logout message (not explicitly illustrated) can be sent to indicate that transmission of the emergency notification is complete.

In at least one implementation, EAS Encoder-Decoder 210 remains logged in as long as a stream of packets EAS Packet(s) 230 continues. In some such embodiments, EAS Encoder-Decoder 210 is automatically logged out after predetermined pause in the packet stream, while in others, a "stream complete" parameter can be included in a final packet of EAS Packet(s) 230.

In various embodiments, login request 229 can include a request to login to one or more specific channels served by Importer-Exporter 260, but not others that are also served by Importer-Exporter 260. In some such cases, Importer-Exporter 260 provides a notification included in EAS Packet(s) 230 to the specifically requested channels, but not other channels served by Importer-Exporter 260. Thus, for example, notification content can be transmitted to a first IBOC sub-channel, but not a second IBOC sub-channel, even if both the first IBOC subchannel and the second IBOC subchannel are both served by Importer-Exporter 260.

In alternate embodiments, no channels are identified in the request, and the login request is interpreted as a request to login to all channels served by Importer-Exporter 260. In some embodiments, any login request is interpreted by Importer-Exporter 260 as a request to login to all channels served by Importer-Exporter 260, regardless of whether or not the login request includes specific channel identifiers.

In some embodiments, the login request may specify access on the basis of geographic location of transmitters broadcasting particular channels. For example, if Importer-Exporter 260 serves channels being transmitted in two different geographic areas, EAS Encoder-Decoder 210 can login to Importer-Exporter 260 for channels being broadcast in one geographic area, but not the other. This can find use where, for example, a tornado warning is issued for one county, but not an adjacent county, and where some of the SPS channels served by Importer-Exporter 260 are in the county for which the warning was issued, but others are not. In that case, Importer-Exporter 260 can provide the emergency notification to transmitters broadcasting in the affected county, but not in the unaffected county. Similarly, the EAS Encoder-Decoder 210 could login to other channels separately to deliver alerts for channels that cover other geographic areas.

In some embodiments, the login request may specify access on the basis of language broadcasting particular channels. For example, if Importer-Exporter 260 serves channels being transmitted in two different language areas, EAS Encoder-Decoder 210 can login to Importer-Exporter 260 for channels being broadcast in one language (i.e., English), but not the other. This can find use where, for example, a tornado warning is issued in both English, and where some of the SPS channels served by Importer-Exporter 260 are English language for which the warning was issued, but others are not. In that case, Importer-Exporter 260 can provide the emergency notification to channels broadcasting in the one language, but not in the others. Similarly, the EAS Encoder-Decoder 210 could login to the Spanish language channels separately to deliver alerts on Spanish speaking channels.

In one or more embodiments, a "heartbeat" and status alarm can be employed by Importer-Exporter 260 and EAS Encoder-Decoder 210. For example, when there is no active alert, EAS Encoder-Decoder 210 can periodically send a heartbeat message to Importer-Exporter 260. If Importer-Exporter 260 does not receive the heartbeat message within a specified period of time, Importer-Exporter 260 can generate an alarm message indicating that communications between Importer-Exporter 260 and EAS Encoder-Decoder 210 have been lost. In similar fashion, Importer-Exporter 260 can periodically send a heartbeat message to EAS Encoder-Decoder 210. If EAS Encoder-Decoder 210 does not receive the heartbeat message within a specified period of time, EAS Encoder-Decoder 210 can generate a message indicating that communications between EAS Encoder-Decoder 210 and Importer-Exporter 260 have been lost. In at least some embodiments, the heartbeat alarm can be activated or deactivated by a user based on the system configuration being employed, or based on user maintenance and notification preferences. In at least one such embodiment, the heartbeat alarm would be turned off by default, but can be activated if an option "process EAS SPS audio via IP is selected." This option can be useful when a dual-mode Importer-Exporter 260 is being used.

In at least one embodiment, some channels served by Importer-Exporter 260 may employ one or more conventional EAS Encoder-Decoders 110 or 120 (Prior Art FIG. 1) on a per-channel basis, while other channels served by Importer-Exporter 260 use EAS Encoder-Decoder 210 employing one or more of the packetized emergency notification delivery techniques disclosed herein. In such cases, including a software or hardware switch, along with appropriate physical connections, can allow a single Importer-Exporter 260 to function with both legacy and new EAS Encoder-Decoders.

In at least one embodiment, communications between Importer-Exporter 260, Channel A audio processor 140, Channel B audio processor 150, Channel n audio processor 280, EAS Encoder-Decoder 210, and Transmitter 270 are performed using a packet switching protocol such as transmission control protocol/Internet protocol (TCP/IP). In other embodiments, the various components of IBOC broadcast system 200 can communicate via networks employing circuit switching protocols, such as an optical mesh network, a secure wireless network, and/or cloud-based architecture. In any case, the various embodiments described herein employ encapsulated or packetized communications between EAS Encoder-Decoder 210 and Importer-Exporter 260, rather than relying on low-level control signals transmitted from multiple EAS Encoder-Decoders to individual switchers on a per-channel basis.

Figure 3:
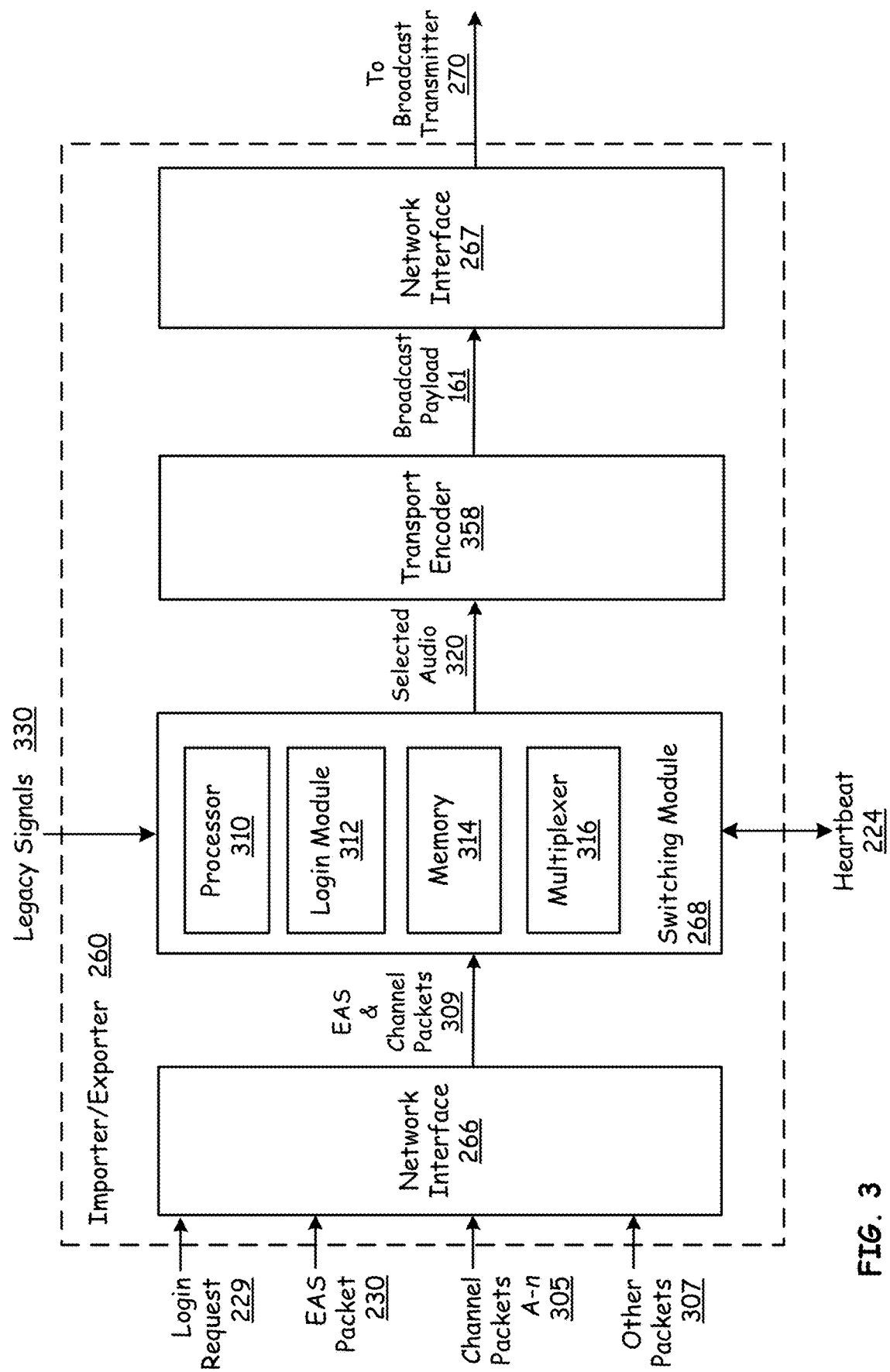
FIG. 3 is a block diagram illustrating an importer-exporter configured to insert notifications into IBOC broadcasts, according to various embodiments of the present disclosure.

Referring next to FIG. 3, a block diagram illustrating an Importer-Exporter 260 configured to insert notifications into IBOC broadcasts will be discussed in accordance with various embodiments of the present disclosure. Importer-Exporter 260 includes Network Interface 266, Switching Module 268, Transport Encoder 358, and Network Interface 267. As previously discussed with respect to FIG. 2, Network Interface 266 receives Login Request 229 and EAS Packet(s) 230 from EAS Encoder-Decoder 210. In addition, Network Interface 266 receives Channel Packets A-n 305, which include Channel A HD Audio 103, Channel B HD Audio 105, and Channel n HD Audio 107 from corresponding audio processors such as Channel A Audio Processor 140, Channel B Audio Processor 150, and Channel n Audio Processor 280. In various embodiments, Channel Packets A-n 305 include audio content processed to adjust signal levels to provide consistent audio levels, peak leveling and frequency enhancement, as discussed with respect to FIG. 2. Other Packets 307 can include artist experience data, media titles, durations, artist identification, related media items, and/or other supplemental information to be included in Broadcast Payload 161.

Figure 1:
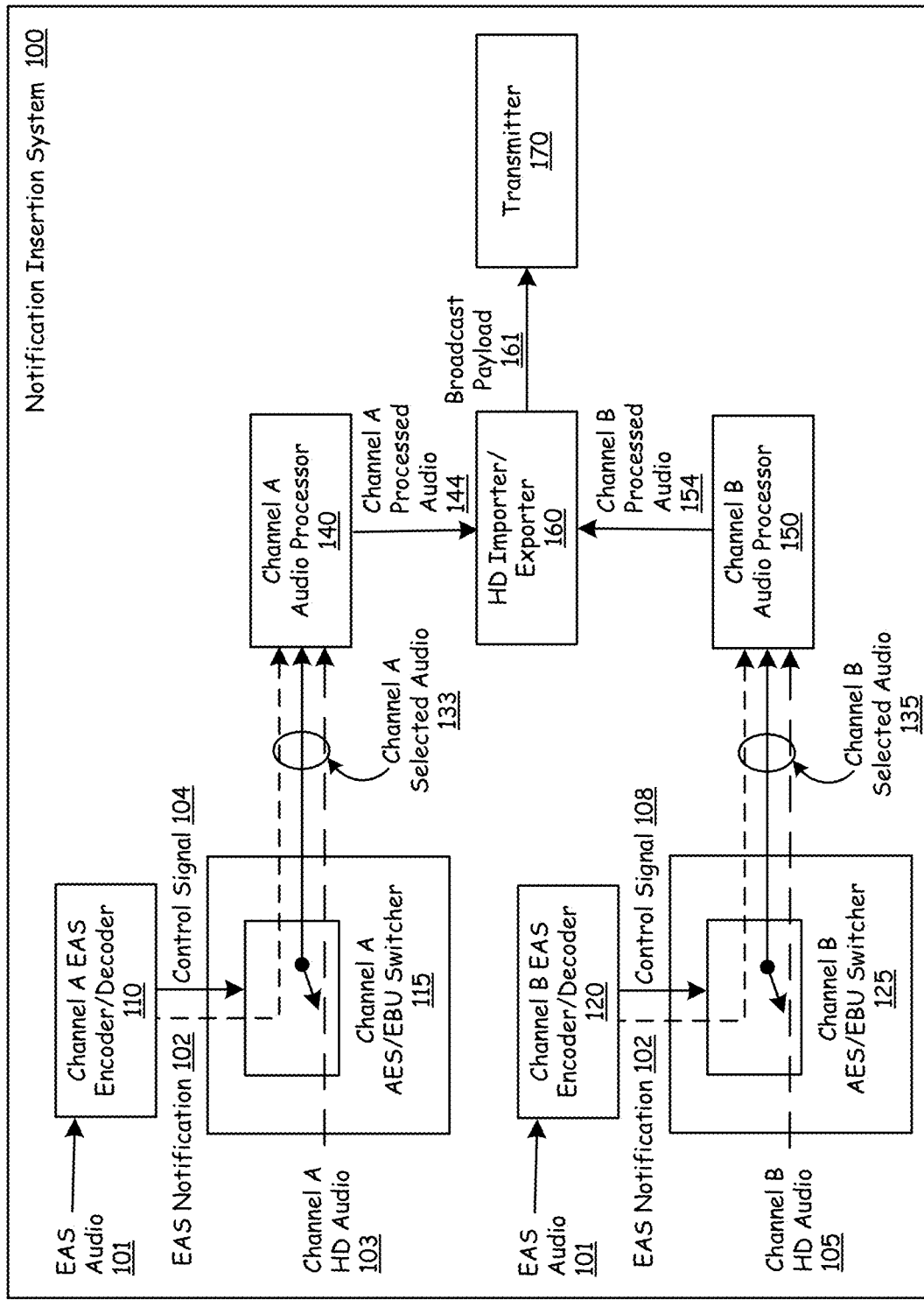
FIG. 1 is diagram illustrating a prior-art system used to insert emergency notifications into in-band on-channel (IBOC) broadcasts.

In various embodiment, Importer-Exporter 260 also receives Heartbeat messages or signals 224 from EAS Encoder-Decoder 210. Some implementations also include support for Legacy Signals 330 received from legacy EAS Encoder-Decoders, such as Channel A EAS Encoder-Decoder 110 (FIG. 1) and Channel B EAS Encoder-Decoder 120 (FIG. 1). In various embodiments, Legacy Signals 330 include low-level switching control signals, and audio that has been pre-processed by an appropriate audio processor, such as Channel A Audio Processor 140 of FIG. 1. In at least some instances, Legacy Signals 330 include non-packetized audio signals.

Switching Module 268 includes Processor 310, Login Module 312, Memory 314, and Multiplexer 316. Processor 310 and Memory 314 cooperate to implement various modules by executing program instructions that control various special purpose hardware, or hardware specifically configured for use by Switching Module 268. For example, Login Module 312 processes Login Request 229 to conditionally switch the content included in Broadcast Payload 161 between channel content received in Channel Packets A-n 305 to notification content received in EAS Packet(s) 230. Login Module 312 is used, in various embodiments, to monitor a stream of EAS Packet(s) 230 to determine when the stream begins and ends, and to determine when EAS Encoder-Decoder 210 is to be logged into, or logged out of, Importer-Exporter 260. Login Module 312 can also include timers, blacklists, whitelists, key generation modules, and communication logic needed to verify login credentials using external resources, and the like. Note that Login Module 312 can also be used to verify and control login of audio processors or other devices attempting to insert their content into Broadcast Payload 161, in which case Other Packets 307 can include login requests from audio processors and other devices or services.

Multiplexer 316 includes software and physical hardware used to selectively switch, route, insert and/or combine information from Channel Packets A-n 305 and EAS Packet(s) 230 into Broadcast Payload 161. Note that EAS and Channel Packets 309 includes both Channel Packets A-n 305 and EAS Packet(s) 230. In embodiments that support legacy EAS Encoder-Decoders, Multiplexer 316 also includes hardware that allows switching between audio sources to be controlled by low level control signals included in Legacy signals 330 transmitted by the legacy EAS Encoder-Decoders. In some embodiments, legacy control signals will be transmitted to Multiplexer 316 only if appropriate hardware or software switches are set in Importer Exporter 260.

After selecting appropriate audio for inclusion in Broadcast Payload 161, Switching Module 268 transmits Selected Audio 320 to Transport Encoder 358. Selected Audio 320 can include program service data (PSD) and program associated data (PAD) received in Other Packets 307. Examples of PSD and PAD data include, but are not limited to, station call letters, supplemental program data, multicast data, data tags, media titles, album artwork, station logos, traffic data for navigation systems, weather images, and weather metadata. Selected Audio 320 can also include Main Program Service (MPS) audio content received in Channel Packets A-n 305, and/or notification content received from EAS Packet(s) 230. Transport Encoder 358 bonds the PSD, PAD, MPS, and any other selected audio related content into Broadcast Payload 161, which is transmitted to the broadcast transmitter.

In the illustrated embodiment, Importer Exporter 260 is located remotely from the broadcast transmitter, and includes Transport Encoder 358 and Network Interface 267. Although not specifically illustrated in FIG. 3, a corresponding network interface and transport decoder can be included at the broadcast transmitter.

In various embodiments, Importer-Exporter 260 can be implemented in a processing system located at a broadcast studio, or a system entirely at the transmitter site, or can be implemented as a service using a hosted processing system, or another processing system located remotely from both the studio and the transmitter. Furthermore, Importer-Exporter 260 can be divided between a first system that implements an importer, which is located at a studio or in the "cloud," and an exporter co-located with the broadcast transmitter. Additionally, in various embodiments Switching Module 268 can be implemented by a processing system separate from the processing system used to implement Importer-Exporter 260.

Figure 4:
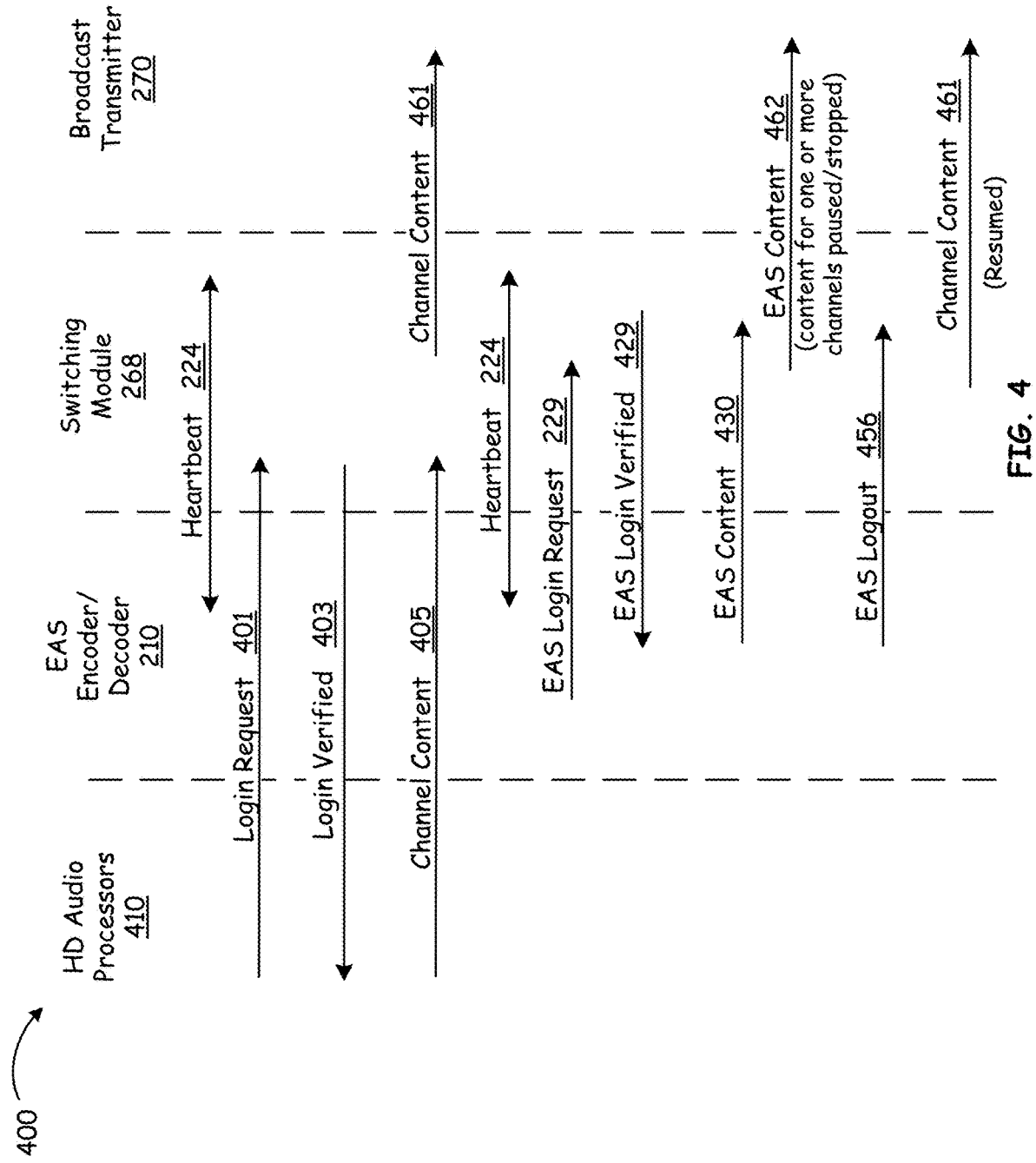
FIG. 4 is a sequence diagram illustrating insertion of notifications into IBOC broadcasts, according to various embodiments of the present disclosure.

Referring next to FIG. 4, a sequence diagram 400 illustrating insertion of notifications into IBOC broadcasts will be discussed in accordance with various embodiments of the present disclosure. In the illustrated example, during periods of time when EAS Encoder-Decoder 210 is not transmitting notifications to Switching Module 268, Heartbeat 224 is periodically transmitted between EAS Encoder-Decoder 210 and Switching Module 268. Heartbeat 224 can be generated by EAS Encoder-Decoder 210 and transmitted to Switching Module 268, or Heartbeat 224 can be generated by Switching Module 268EAS and transmitted to Encoder-Decoder 210. In some embodiments, Heartbeat 224 can be included in a field in a packet header, data included in a packet's payload. In some embodiment, receipt of any message transmitted between EAS Encoder-Decoder 210 and Switching Module 268, can serve as Heartbeat 224.

If EAS Encoder-Decoder 210 transmits Heartbeat 224, but Importer-Exporter 260 does not receive Heartbeat 224 before expiration of a specified time period, Importer-Exporter 260 can generate an alarm message (not explicitly illustrated) indicating that communications between Importer-Exporter 260 and EAS Encoder-Decoder 210 have been lost. The alarm message can be sent directly to another device in the notification insertion system, for example to a studio or transmitter site, to a monitoring device or service in communication with the notification insertion system, to a secondary EAS Encoder-Decoder (not illustrated), to a network-connected monitoring service (not explicitly illustrated), or the like. In similar fashion, if Importer-Exporter 260 generates Heartbeat 224 and EAS Encoder-Decoder 210 does not receive the heartbeat message within a specified period of time, EAS Encoder-Decoder 210 can generate the alarm message During non-emergency operations, each of multiple HD Audio processors 410 transmits Login Request 401 to Switching Module 268. Upon authentication and authorization, Switching Module 268 transmits a Login Verified message 403 to HD Audio processors 410, which then transmits Channel Content 405 to Switching Module 268. Switching Module 268 transmits Channel Content 461 to Broadcast Transmitter 270, by including Channel Content 461 in Broadcast Payload 161 (FIG. 2). Thus, during times when there is no emergency notification, "regular" is broadcast by Broadcast Transmitter 270.

However, when EAS Encoder-Decoder 210 receives an emergency notification to be distributed, it transmits EAS Login Request 229 to Switching Module 268. Upon authentication and authorization, Switching Module 268 transmits EAS Login Verified message 429 to EAS Encoder-Decoder 210, which then transmits EAS Content 430 to Switching Module 268. Switching Module 268 transmits EAS Content 430 to Broadcast Transmitter 270, in Broadcast Payload 161 (FIG. 2), and pauses or stops transmission of Channel Content 461. Thus, during emergencies, emergency content is broadcast by Broadcast Transmitter 270 in place of "regular" content.

In various embodiments, pausing the transmission of Channel Content 461 refers to inserting EAS content 462 in its place. The paused content can be placed in a buffer or queue, discarded, or the like. In addition, although not specifically illustrated, a Switching Module 268 can transmit an interruption notification to a monitoring system (not specifically illustrated), indicating that normally scheduled content has been interrupted by an emergency message. This interruption notification can be used to aid in rescheduling interrupted content as necessary, and for logging message transmission for regulatory compliance.

In at least one embodiment, EAS Logout 456 is transmitted from EAS Encoder-Decoder 210 to Switching Module 268, and in response to receiving EAS Logout 456, Switching Module 268, resumes delivery of Channel Content 461. In other embodiments, an explicit logout request is not used. Instead Switching Module 268 logs out EAS Encoder-Decoder 210 automatically at the conclusion of a predetermined time period, or when transmission of EAS content 430 from EAS Encoder Decoder 210 to Switching Module 268 terminates, or upon occurrence of another specified event. In any case, transmission of the Channel Content 461 to Broadcast Transmitter 270 can be resumed in response to EAS Encoder-Decoder 210 being logged out of Switching Module 268.

Figure 5:
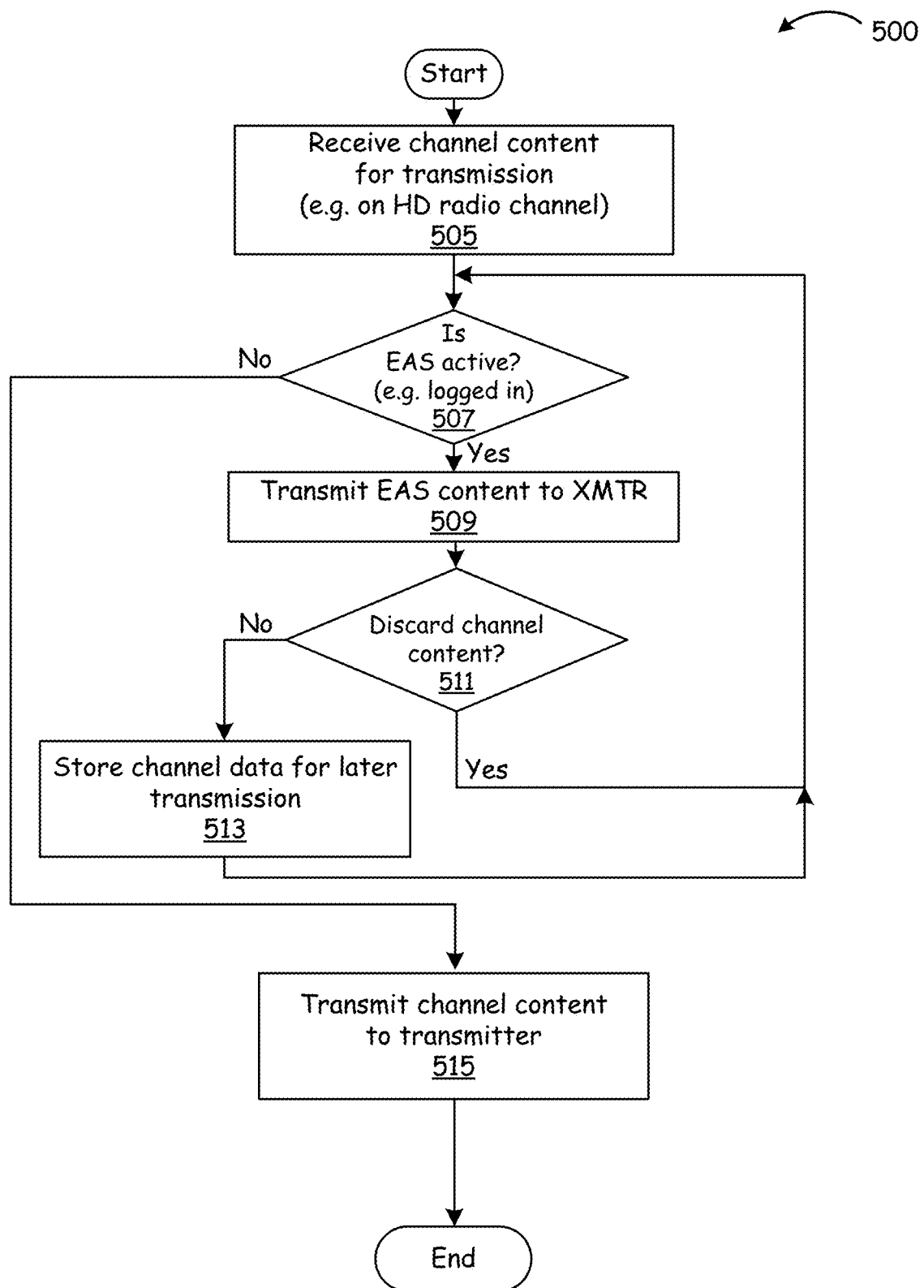
FIG. 5 is a flowchart illustrating a method of inserting notifications into IBOC broadcasts, according to various embodiments of the present disclosure.

Referring next to FIG. 5, a flowchart illustrating a method 500 of inserting notifications into IBOC broadcasts will be discussed in accordance with various embodiments of the present disclosure. As illustrated by block 505, channel content to broadcast on a media channel is received at a switching module.

As illustrated at block 507, a check is made to determine if an EAS system is active, or transmitting notifications to the switching module. The determination regarding whether the EAS system is active can be made based on a login status of an EAS Encoder-Decoder, based on whether a stream of EAS packets is currently being received, based on a field included in a packet, or the like.

As illustrated by block 509, if the EAS system is determined to be active, EAS content is sent to the broadcast transmitter in place of channel content. As illustrated by block 515, if the EAS system is determined to be inactive, EAS channel content is sent to the broadcast transmitter in accordance with non-emergency notification operation.

As illustrated by block 511, if the EAS is active, a decision is made regarding whether to discard the channel content being replaced by the EAS channel content. If the content is to be discarded, method 500 returns to block 507, and the loop continues until the EAS system is no longer active. If the content is not to be discarded, method 500 moves to block 513, and channel data is stored for transmission after the EAS system is no longer active. As illustrated by block 515, when EAS is inactive, the channel content is transmitted to the broadcast transmitter.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. An importer-exporter comprising:
   a processor;
   a network interface coupled to the processor and configured to communicate with an external device via a communications network;
   memory coupled to the processor, the memory storing a program of instructions, wherein executing the program of instructions configures the processor to:
   receive, from an external device via the network interface, a request to insert media content into a broadcast payload;
   determine whether the external device is authorized to provide the media content for insertion into the broadcast payload;
   in response to determining that the external device is authorized:
   login the external device to the importer-exporter;
   receive the media content from the external device; and
   insert the media content into the broadcast payload.

2. The importer-exporter of claim 1, wherein executing the program of instructions further configures the processor to:
   transmit a login verified message to the external device in response to determining that the external device is authorized, wherein the external device includes a channel processor associated with a particular media channel; and
   receive, from the channel processor, channel packets including the media content.

3. The importer-exporter of claim 2, wherein, executing the program of instructions further configures the processor, during a time when the channel processor is logged in, to:
   receive, from an Emergency Alert System (EAS) encoder, a request to insert EAS notification content into the broadcast payload;
   login the EAS encoder to the importer-exporter;
   receive, from the EAS encoder, EAS packets including the EAS notification content;
   pause insertion of the channel packets into the broadcast payload;
   insert the EAS packets into the broadcast payload;
   logout the EAS encoder from the importer-exporter; and
   resume insertion of the channel packets into the broadcast payload.

4. The importer-exporter of claim 1, wherein executing the program of instructions further configures the processor to:
   transmit a login verified message to the external device in response to determining that the external device is authorized, wherein the external device includes an Emergency Alert System (EAS) encoder; and
   receive, from the EAS encoder, EAS packets including EAS notification content.

5. The importer-exporter of claim 4, wherein executing the program of instructions further configures the processor to, in response to receiving the EAS packets from the EAS encoder:
   pause insertion of non-EAS content into the broadcast payload; and
   insert the EAS packets into the broadcast payload.

6. The importer-exporter of claim 5, wherein executing the program of instructions further configures the processor to:
   logout the EAS encoder from the importer-exporter; and
   resume insertion of non-EAS content into the broadcast payload.

7. The importer-exporter of claim 6, wherein executing the program of instructions further configures the processor to:
   logout the EAS encoder from the importer-exporter in response to receiving an explicit logout request, upon conclusion of a predetermined time period, or in response termination of EAS packet transmissions.

8. A method comprising:
   receiving a request to insert media content into a broadcast payload at a first processing device including a processor and associated memory, wherein the request is transmitted by a second device;
   determining whether the second device is permitted to provide the media content for insertion into the broadcast payload;
   in response to determining that the second device is permitted:
   logging in the second device;
   receiving the media content from the second device; and
   inserting the media content into the broadcast payload.

9. The method of claim 8, further comprising:
   transmitting a login verified message to the second device in response to determining that the second device is permitted, wherein the second device includes a channel processor associated with a particular media channel; and
   receiving, from the channel processor, channel packets including the media content.

10. The method of claim 9, further comprising:
    receiving, from an Emergency Alert System (EAS) encoder, a request to insert EAS notification content into the broadcast payload;
    logging in the EAS encoder;
    receiving, from the EAS encoder, EAS packets including the EAS notification content stopping insertion of the channel packets into the broadcast payload;
    inserting the EAS packets into the broadcast payload;
    logging out the EAS encoder; and
    resuming insertion of the channel packets into the broadcast payload.

11. The method of claim 8, further comprising:
    transmitting a login verified message to the second device in response to determining that the second device is permitted, wherein the second device includes an Emergency Alert System (EAS) encoder; and
    receiving, from the EAS encoder, EAS packets including EAS notification content.

12. The method of claim 11, further comprising:
    pausing insertion of non-EAS content into the broadcast payload; and
    inserting the EAS packets into the broadcast payload.

13. The method of claim 12, further comprising:
  logging out the EAS encoder; and
resuming insertion of the non-EAS content into the broadcast payload.

14. The method of claim 13, further comprising:
  logging out the EAS encoder in response to receiving an explicit logout request, upon conclusion of a predetermined time period, or in response termination of EAS packet transmissions.

15. An importer-exporter comprising:
  a processor;
  a network interface coupled to the processor and configured to communicate with a plurality of external devices via a communications network; and
  memory coupled to the processor, the memory storing a program of instructions, wherein executing the program of instructions configures the processor to control insertion of channel packets and EAS packets into a broadcast payload based on login statuses of the plurality of external devices.

16. The importer-exporter of claim 15, wherein executing the program of instructions further configures the processor to:
  receive a first login request from a first external device associated with a media channel;
    permit login of the first external device in response to determining that the first external device is authorized to provide media content for insertion into the broadcast payload;
  receive the channel packets from the first external device; and
  insert the channel packets into the broadcast payload.

17. The importer-exporter of claim 16, wherein executing the program of instructions further configures the processor to:
  transmit a login verified message to the first external device in response to authenticating the first external device.

18. The importer-exporter of claim 16, wherein, executing the program of instructions further configures the processor, during a time when the first external device is logged in, to:
  receive a second login request from a second external device, a request to insert emergency alert system (EAS) notification content into the broadcast payload;
    permit login of the second external device in response to determining that the second external device is authorized to provide EAS notification content for insertion into the broadcast payload;
  receive the EAS packets from the second external device;
  pause insertion of the channel packets into the broadcast payload;
  insert the EAS packets into the broadcast payload;
  logout the second external device from the importer-exporter; and
  resume insertion of the channel packets into the broadcast payload.

19. The importer-exporter of claim 18, wherein executing the program of instructions further configures the processor to:
  transmit a login verified message to the second external device in response to authenticating the second external device.

20. The importer-exporter of claim 18, wherein executing the program of instructions further configures the processor to:
  logout the second external device from the importer-exporter in response to receiving an explicit logout request, upon conclusion of a predetermined time period, or in response termination of EAS packet transmissions.

* * * * *